United States Patent
Mayumi et al.

(10) Patent No.: US 11,161,439 B2
(45) Date of Patent: Nov. 2, 2021

(54) COVERING CLAMPING CLAMP SET

(71) Applicants: TOYOTA BOSHOKU (CHINA) CO., LTD., Shanghai (CN); NIFCO (TIANJIN) CO., LTD., Tianjin (CN)

(72) Inventors: Fukuo Mayumi, Shanghai (CN); Hiroyuki Abe, Shanghai (CN); Qinjun Fei, Shanghai (CN); Mutsumi Nishino, Tianjin (CN); Kazunari Miyasaka, Tianjin (CN)

(73) Assignee: TOYOTA BOSHOKU (CHINA) CO., LTD., Shanghai (CN)

( * ) Notice: Subject to any disclaimer, the term of this patent is extended or adjusted under 35 U.S.C. 154(b) by 33 days.

(21) Appl. No.: 16/275,050

(22) Filed: Feb. 13, 2019

(65) Prior Publication Data
US 2019/0275918 A1 Sep. 12, 2019

(30) Foreign Application Priority Data
Feb. 13, 2018 (CN) .......................... 201810150789.7

(51) Int. Cl.
| | |
|---|---|
| *B60N 2/58* | (2006.01) |
| *F16B 5/06* | (2006.01) |
| *F16B 21/07* | (2006.01) |
| *F16B 2/20* | (2006.01) |

(52) U.S. Cl.
CPC .......... *B60N 2/5825* (2013.01); *F16B 5/0692* (2013.01); *F16B 21/073* (2013.01); *F16B 2/20* (2013.01)

(58) Field of Classification Search
CPC ..... B60N 2/5825; F16B 5/0692; F16B 21/073
See application file for complete search history.

(56) References Cited

U.S. PATENT DOCUMENTS

| | | |
|---|---|---|
| 5,312,160 A | 5/1994 | Davis et al. |
| 5,681,083 A | 10/1997 | Nelson et al. |
| 7,380,812 B2 | 6/2008 | Tracht et al. |
| (Continued) | | |

FOREIGN PATENT DOCUMENTS

| | | |
|---|---|---|
| AT | 512894 B1 | 12/2013 |
| DE | 8326045 U1 | 12/1983 |
| (Continued) | | |

OTHER PUBLICATIONS

Notice of Reasons for Refusal, Application No. Japanese Patent Application No. 2019-023179, Date of Drafting: REIWA 1(Oct. 30, 2019) 3524 3WOO, Representative/Applicant: Ueda, Kunio (And 3 Others), Applied Provisions: Article 29(2).

(Continued)

*Primary Examiner* — Jason W San
(74) *Attorney, Agent, or Firm* — Flener IP & Business Law; Zareefa B. Flener

(57) ABSTRACT

It is provided a covering clamping clamp set formed by coupling a plurality of clamps together. Each of the clamps comprises a base portion formed as a plate shape and retaining a foam body as well as a clamping portion protruded from the base portion and clamping a member to be clamped which is mounted on a covering covers the foam body, wherein a fragile portion is provided between adjacent ones of the clamps. The covering clamping clamp set is capable of improving operating efficiency, shortening operating time and reducing cost.

16 Claims, 13 Drawing Sheets

(56) References Cited

U.S. PATENT DOCUMENTS

| | | | |
|---|---|---|---|
| 9,896,008 B2* | 2/2018 | Sato | B60N 2/5825 |
| 2003/0215601 A1* | 11/2003 | Pedde | B29C 44/1271 |
| | | | 428/102 |
| 2005/0088014 A1 | 4/2005 | Woodson et al. | |
| 2008/0224509 A1 | 9/2008 | Demick | |
| 2008/0258523 A1 | 10/2008 | Santin et al. | |
| 2013/0247338 A1* | 9/2013 | Santin | B29C 39/10 |
| | | | 24/545 |
| 2014/0068900 A1* | 3/2014 | Lovasz | B60N 2/5825 |
| | | | 24/543 |
| 2014/0352117 A1* | 12/2014 | Murasaki | B60N 2/5825 |
| | | | 24/581.11 |
| 2015/0307001 A1* | 10/2015 | Sahashi | B60N 2/5825 |
| | | | 297/218.2 |
| 2016/0280105 A1* | 9/2016 | Sato | B60N 2/5825 |
| 2016/0280106 A1* | 9/2016 | Sato | B60N 2/6027 |
| 2016/0280107 A1* | 9/2016 | Sato | F16B 2/22 |
| 2016/0358518 A1* | 12/2016 | Burout | G09F 3/14 |
| 2018/0236915 A1* | 8/2018 | Agonia | F16B 21/073 |
| 2019/0320592 A1* | 10/2019 | Schuttler | G09F 3/08 |

FOREIGN PATENT DOCUMENTS

| | | |
|---|---|---|
| DE | 3840698 A1 | 6/1989 |
| DE | 10137022 A1 | 2/2003 |
| DE | 102008014061 A1 | 10/2008 |
| DE | 102009050842 A1 | 4/2011 |
| DE | 10201051386 A1 | 5/2012 |
| EP | 1321213 A2 | 6/2003 |
| JP | 2003310417 A | 11/2003 |
| JP | 2010524569 A | 7/2010 |
| JP | 2011235957 A | 11/2011 |
| JP | 2014141132 A | 8/2014 |
| JP | 3197527 U | 5/2015 |
| JP | 2016186324 A | 10/2016 |
| WO | 2016170687 A | 11/2017 |

OTHER PUBLICATIONS

German Patent Office Search Report (Boris Jilg) dated Aug. 27, 2020.

Japanese Office Action for Japanese Patent Application No. 2019-23179, dated Jun. 18, 2021.

* cited by examiner

COVERING CLAMPING CLAMP SET

CROSS-REFERENCE TO RELATED APPLICATION

This application claims priority to Chinese patent application No. 201810150789.7 filed on Feb. 13, 2018, the disclosure of which is incorporated in its entirety by reference herein.

TECHNICAL FIELD

The present disclosure relates to a covering clamping clamp set.

BACKGROUND

Conventionally, coverings (fabric layers or leather layers), such as used for car seats, are clamped to foam bodies by clamping members. Such clamping members are disclosed in Patent Document 1.

However, for only one seat, approximately 25 clamping members as described in Patent Document 1 are required to mount the covering. Moreover, the plurality of clamping members will need to be mounted one by one in the foam body by an operator. A device for delivering the clamping members such as a parts conveyer is then required, this leads to a low operating efficiency and a high cost.

Patent Document

Patent Document 1: Japanese Patent Laid-Open Publication No. 2016-186324

SUMMARY

In order to solve the above problem, an object of the present disclosure is to provide a covering clamping clamp set, which is capable of providing an improved operating efficiency, a shortened operating time and a reduced cost.

A covering clamping clamp set according to solution 1 of the present disclosure is formed by coupling a plurality of clamps together, characterized in that each of the clamps comprises a base portion formed as a plate shape and retaining a foam body as well as a clamping portion protruded from the base portion and clamping a member to be clamped which is mounted on a covering covers the foam body, wherein a fragile portion is provided between adjacent ones of the clamps.

The covering clamping clamp set according to solution 2 of the present disclosure is characterized in that the fragile portion has a thickness smaller than that of the base portion.

The covering clamping clamp set according to solution 3 of the present disclosure is characterized in that the fragile portion is formed by a slot having a V-shaped cross section.

The covering clamping clamp set according to solution 4 of the present disclosure is characterized in that the fragile portion is formed by a slot having a rectangular cross section.

The covering clamping clamp set according to solution 5 of the present disclosure is characterized in that in a thickness direction of the base portion, one side of the fragile portion is formed by a slot having a V-shaped cross section, and the other side of the fragile portion is formed by a slot having a rectangular cross section.

The covering clamping clamp set according to solution 6 of the present disclosure is characterized in that an angle of the V-shaped slot is between 30 and 90 degrees.

The covering clamping clamp set according to solution 7 of the present disclosure is characterized in that the angle of the V-shaped slot is 60 degrees.

The covering clamping clamp set according to solution 8 of the present disclosure is characterized in that a bottom of the rectangular slot has a width of 0.1 mm or less.

The covering clamping clamp set according to solution 9 of the present disclosure is characterized in that the width of the bottom of the rectangular slot is 0.06 mm.

The covering clamping clamp set according to solution 10 of the present disclosure is characterized in that the fragile portion has a thickness no more than half of that of the base portion.

The covering clamping clamp set according to solution 11 of the present disclosure is characterized in that the thickness of the fragile portion is 0.5 mm or less.

The covering clamping clamp set according to solution 12 of the present disclosure is characterized in that the thickness of the fragile portion is 0.4 mm.

A covering clamping clamp set according to solution 13 of the present disclosure is formed by coupling a plurality of clamps together, characterized in that each of the clamps comprises a base portion formed as a plate shape and retaining a foam body as well as a clamping portion protruded from the base portion and clamping a member to be clamped which is mounted on a covering covers the foam body, wherein a coupling portion is provided between adjacent ones of the clamps for coupling their base portions together.

According to the present disclosure, when taking the clamps off the covering clamping clamp set to mount them in a seat, an operator can remove the clamps by simply breaking the fragile portions with one hand, which enables not only an improved operating efficiency, but also a shortened operating time.

Moreover, conventional devices such as clamp feeding devices are not required, which enables a cost reduction.

In addition, since it is provided a structure of a simple-broken fragile portion or a releasable coupling portion, no extra members are generated, it is therefore possible to save molding materials as well as mount the clamps in a seat without any further handling after the removal.

DETAILED DESCRIPTION

Figure 1:
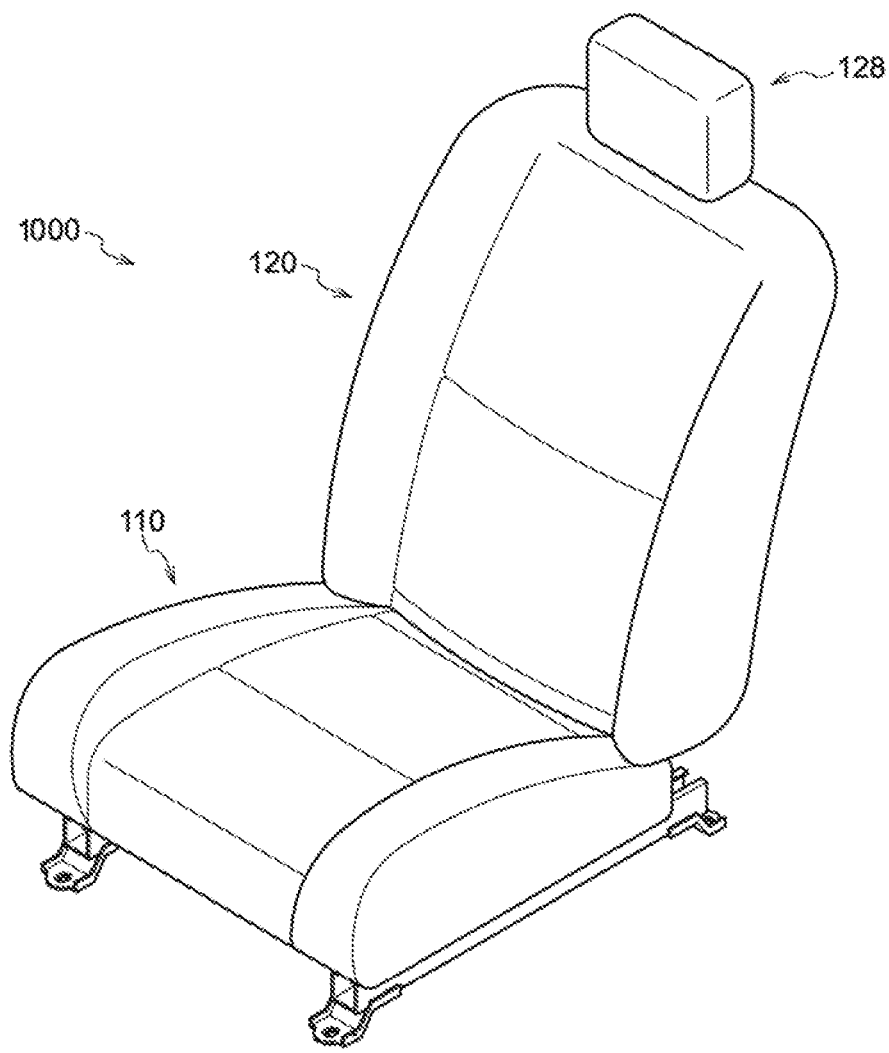
FIG. 1 is a perspective view of a seat using clamps according to the present disclosure.

Hereinafter, examples of a covering clamping clamp set according to exemplary embodiments of the present disclosure will be described with reference to FIGS. 1 to 13.

It shall be noted that, in the drawings, an arrow H indicates a top-bottom direction of the covering clamping clamp set, an arrow W indicates a width direction of the covering clamping clamp set, and an arrow L indicates a front-rear direction of the covering clamping clamp set. In the exemplary embodiments, when using the "top-bottom direction", the "width direction" and the "front-rear direction", several respective or corresponding directions refer to several directions of the covering clamping clamp set of the exemplary embodiments.

Overall Configuration of Clamp 10

First, a seat 1000 of a vehicle using clamps 10 will be explained below. As shown in FIG. 1, the seat 1000 includes a cushion portion 110, a backrest portion 120 and a headrest portion 128, which support an occupant's hips or similar body parts, back and waist areas and head, respectively.

Figure 2:
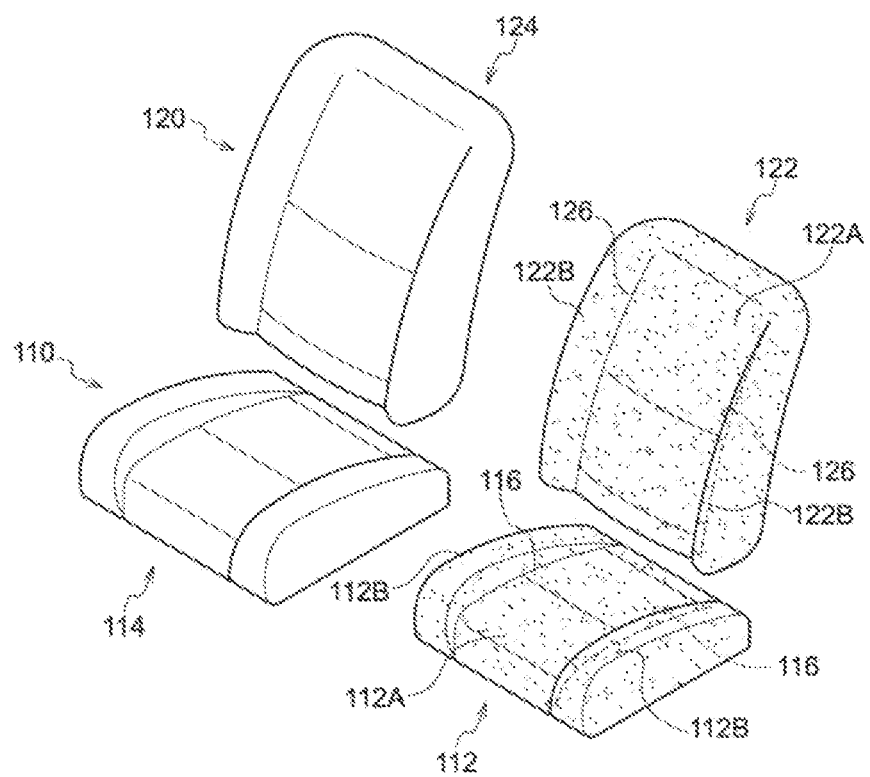
FIG. 2 is an exploded perspective view of the seat using clamps according to the present disclosure.

As shown in FIG. 2, the cushion portion 110 includes a pad 112 (an example of foam body) and a covering 114. Moreover, the pad 112 includes a main body portion 112A and a pair of supporting portions 112B are arranged on both sides of the main body portion 112A along a width direction thereof.

Grooves 116 are formed between each of the supporting portions 112B and the main body portion 112A, and the clamps 10 are disposed at bottoms of the grooves 116. Specifically, when molding the pad 112 with foam, the clamps 10 are inserted into a mold so that the clamps 10 can be disposed at the bottoms of the grooves 116 (see FIGS. 4 and 5).

Figure 4:
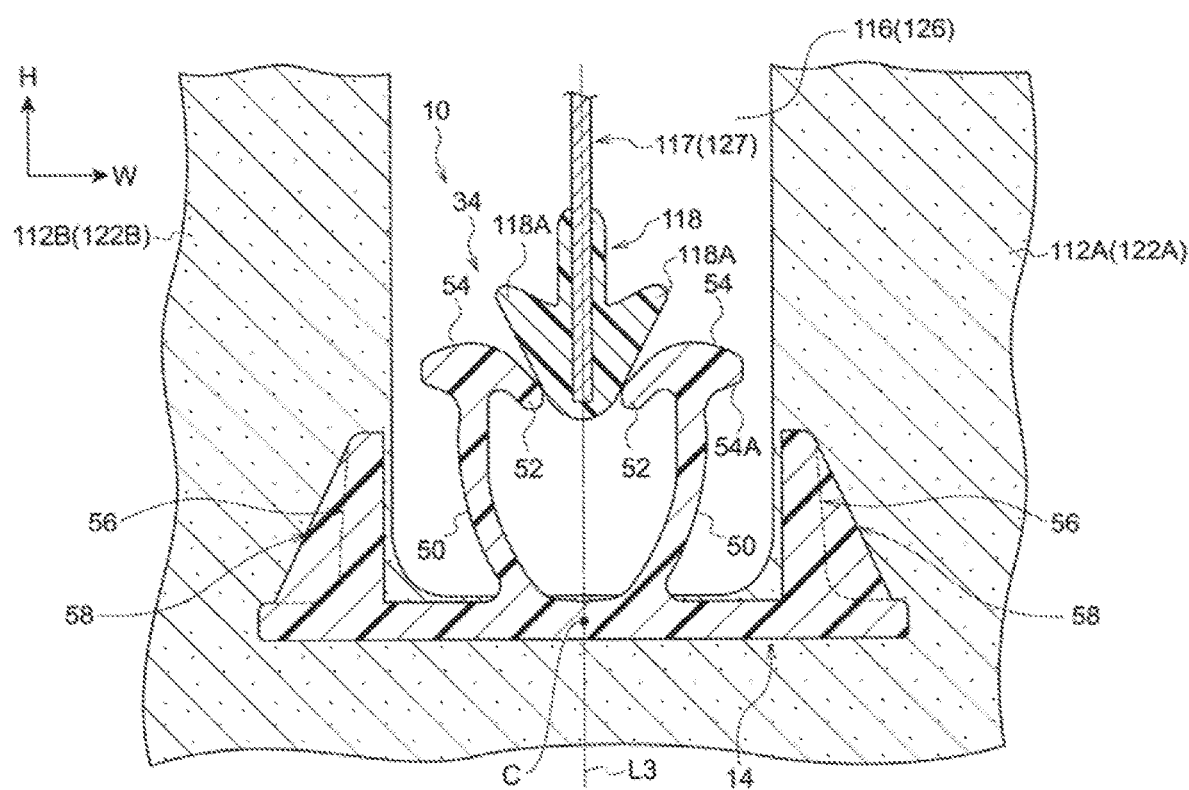
FIG. 4 is a cross-sectional view showing the clamp according to the present disclosure being mounted in the seat, and shows a state before a hanger is inserted.
Figure 5:
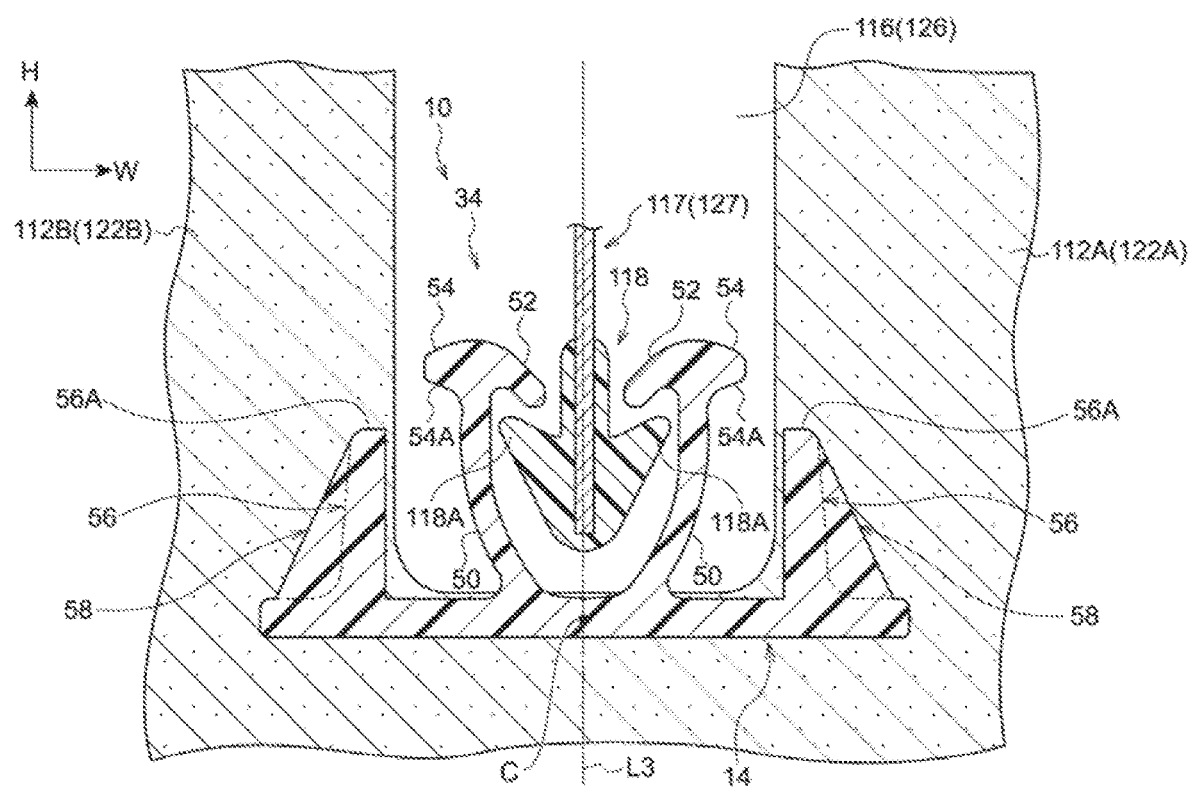
FIG. 5 is a cross-sectional view showing the clamp according to the present disclosure being mounted in the seat, and shows a state after the hanger is inserted.

As an example of a member to be clamped, a hanger 118 fixed to a sheet element 117 attached to the covering 114 is clamped into each of the clamps 10 (see FIGS. 4 and 5).

Similarly, the backrest portion 120 includes a pad 122 (an example of foam body) and a covering 124, as shown in FIG. 2. The pad 122 includes a main body portion 122A and a pair of supporting portions 122B are arranged on both sides of the main body portion 122A along a width direction thereof.

Grooves 126 are formed between each of the supporting portions 122B and the main body portion 122A, and the clamps 10 are disposed at bottoms of the grooves 126. Specifically, when molding the pad 122 with foam, the clamps 10 are inserted into a mold so that the clamps 10 can be disposed at the bottoms of the grooves 126 (see FIGS. 4 and 5).

As an example of a member to be clamped, a hanger 118 fixed to a sheet element 127 attached to the covering 124 is clamped into the clamp 10 (see FIGS. 4 and 5).

Hanger 118

Each of the hangers 118 extends along a bottom surface of each of the grooves 116, 126 and has a tapered shape on its tip side, as shown in FIGS. 4 and 5. A pair of protrusions 118A are formed to protrude towards outer sides (left and right directions of FIGS. 4 and 5) at portions on a base end side of each of the hangers 118.

Clamp 10

Figure 3:
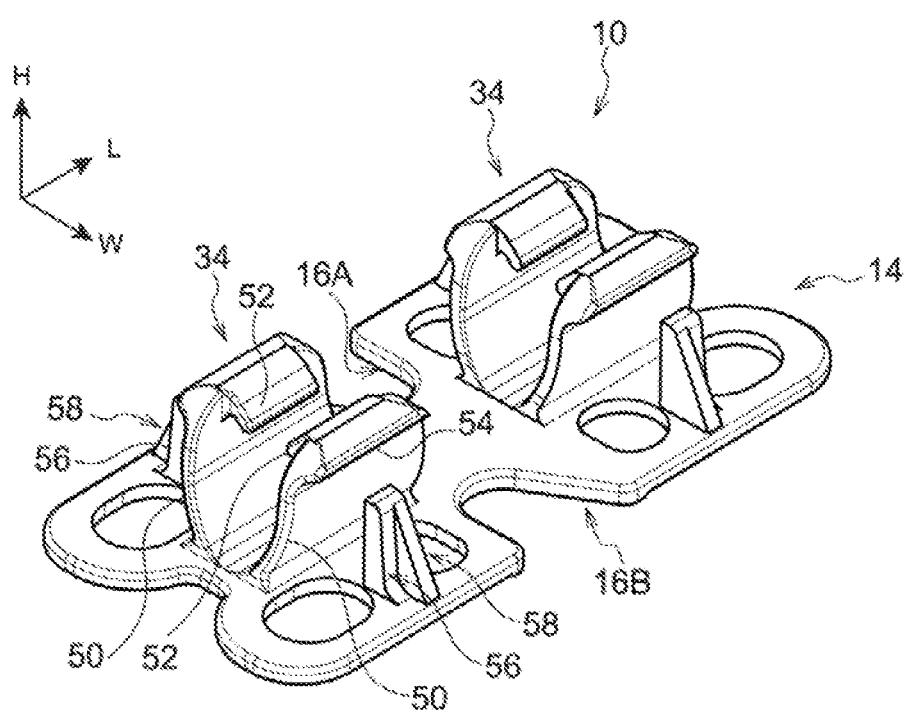
FIG. 3 is a perspective view of a clamp according to the present disclosure.

A plurality of clamps 10 are formed by integrally molding a covering clamping clamp set 100 (see FIGS. 7A and 7B, hereinafter referred to as "clamp set 100") from resin material, and each includes a plate-shaped base portion 14 held by the pad 112, 122 (see FIG. 2) and two clamping portions 34 upwardly protruded from a surface of the base portion 14, as shown in FIG. 3.

Base Portion 14

The base portion 14 has a plate surface facing a top-bottom direction and extending in a front-rear direction (length direction), and is formed by a rectangular main plate body extending in the front-rear direction. Moreover, the base portion 14 includes notches 16A and 16B formed on its edges extending in the front-rear direction, as shown in FIG. 3.

In this exemplary embodiment, a central region in the front-rear direction of the base portion 14 has a thickness of 1.2 mm, which is slightly larger than a thickness of 1.0 mm of rest of the regions of the base portion 14.

Clamping Portion 34

As shown in FIG. 3, two clamping portions 34 are arranged side by side in the front-rear direction, and are upwardly protruded from a top surface of the base portion 14.

The notches 16A, 16B are arranged between one and the other of said two clamping portions 34. Since each of the clamping portions 34 is configured to have a similar or identical shape, only one of the clamping portions 34 will be explained below.

As shown in FIG. 3, the clamping portion 34 includes a pair of extending portions 50 which are protruded from the top surface of the base portion 14 and arranged to face each other, and a pair of clamping claws 52 which are formed at tip ends of the extending portions 50, respectively, and which are fitted around and clamping the hanger 118 (see FIGS. 4 and 5). The pair of extending portions 50 and the pair of clamping claws 52 are respectively symmetric to each other with respect to a center line L3 of the base portion 14 in the top-bottom direction (see FIGS. 4 and 5, L3 is a center line passing through the center of mass C of the clamp 10).

The pair of extending portions 50 are angled outwardly in the width direction so as to be spaced further apart from each other at the tip end thereof than at a base end thereof. Each of the extending portions 50 is curved so as to protrude outwardly in the width direction. The extending portions 50 are elastic deformable such that the tip ends thereof can move away from each other.

Further, the clamping claws 52 are formed at the tip ends of the respective extending portions 50, such that tip end edges of the pair of clamping claws 52 are close to each other.

As shown in FIGS. 4 and 5, in this configuration, in a state where the clamps 10 are arranged inside the pads 112, 122, the clamping portions 34 are disposed in the grooves 116, 126 of the pads 112, 122, and expose to the outside in the foam body.

In order to fit the pair of clamping claws 52 around the hanger 118 and clamp it, the respective extending portions 50 are elastically deformed through the processes as shown in FIGS. 4 and 5, so that the pair of clamping claws 52 are moved away from each other and finally clamp the hanger 18.

Clamp Set 100

Figure 6:
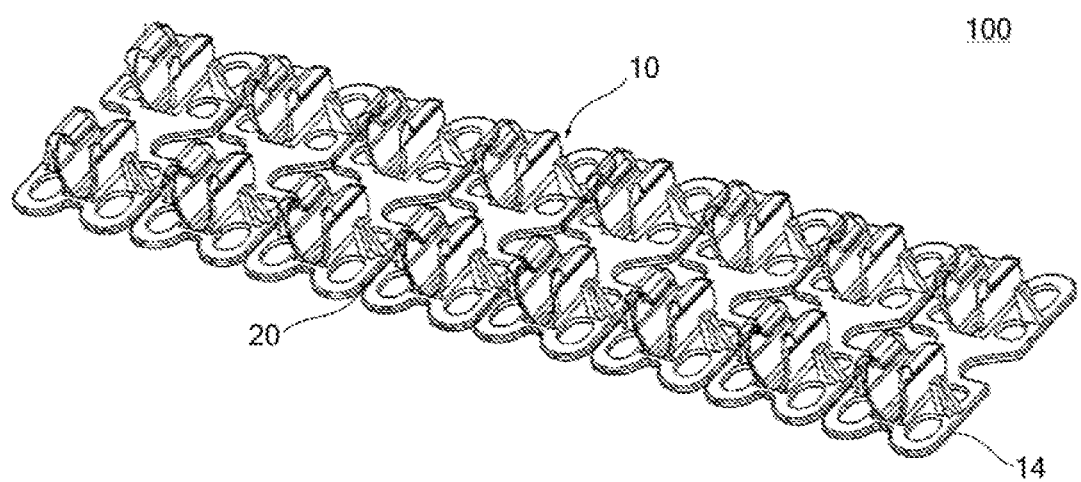
FIG. 6 is a perspective view of a clamp set according to the present disclosure.
Figure 7A:
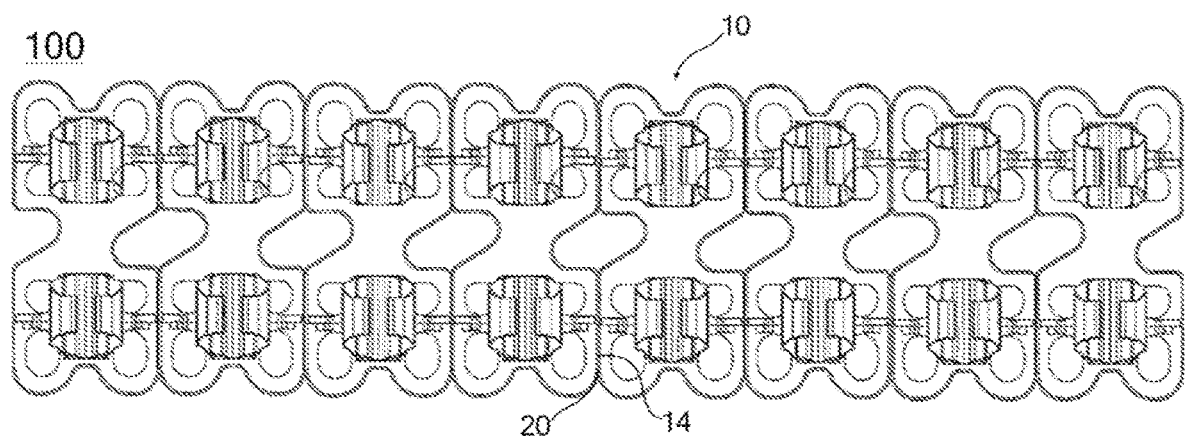
FIG. 7A is a top view of the clamp set according to the present disclosure.
Figure 7B:
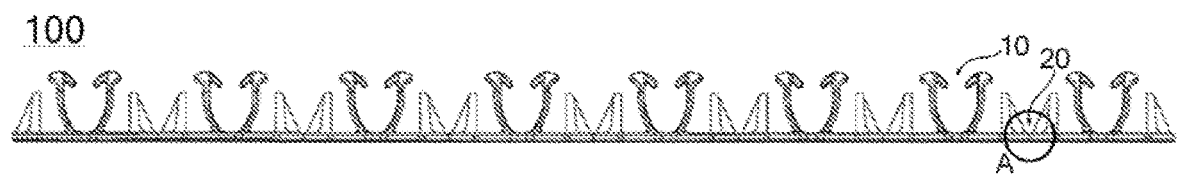
FIG. 7B is a cross-sectional view of the clamp set according to the present disclosure.

As shown in FIGS. 6, 7A and 7B, a clamp set 100 including a plurality of clamps 10 is one-time molded by resin molding or the like when manufacturing the clamps 10, although the clamps 10 are used singly in the seat.

As illustrated in the figures, the plurality of clamps 10 are coupled by fragile portions 20 having a thickness smaller than that of the base portions 14 to form the clamp set 100. In the figures, in order to shorten an overall length of the clamp set 100, it is preferable that the fragile portions 20 are formed on long edges of the base portions 14, but they may be formed on short edges of the base portions 14 instead.

Fragile Portion 20

First Embodiment

Figure 8:
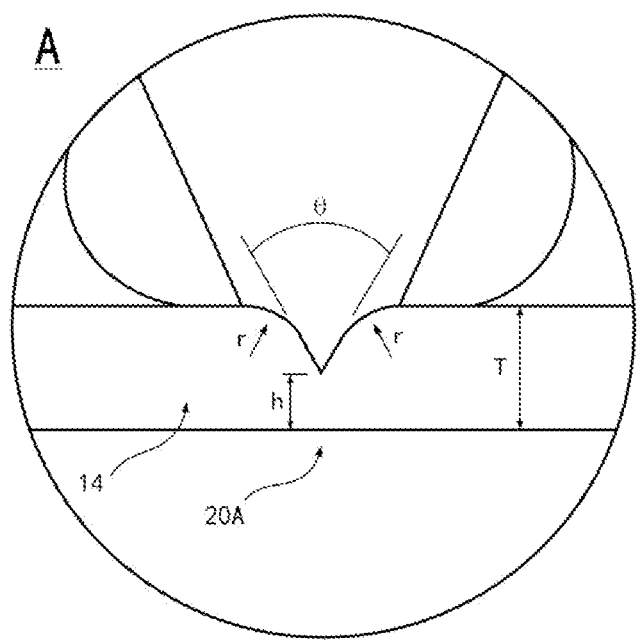
FIG. 8 is an enlarged view of a part A of FIG. 7B, and is a cross-sectional view showing a fragile portion according to a first embodiment of the present disclosure.

A fragile portion 20A according to a first embodiment will be described with reference to FIG. 8. As shown in FIG. 8, the fragile portion 20A is formed between the base portions 14 of two adjacent clamps 10 with a thickness smaller than that of the base portions 14. The fragile portion 20A is formed by a V-shaped slot recessed in the base portions 14.

Here, as discussed above, the thickness T of the base portions 14 is about 1 mm. In contrast, the fragile portion 20A has a thickness h that is substantially no more than half of that of the base portions 14. That is, the thickness h of the fragile portion 20A is 0.5 mm or less. Preferably, the thickness h of the fragile portion 20A is about 0.4 mm.

In addition, with respect to the V-shaped slot forming the fragile portion 20A, an angle θ formed between two sides thereof is in the range of 30 to 90 degrees, and is preferably about 60 degrees.

According to this embodiment, a chamfer is formed between the V-shaped slot forming the fragile portion 20A and each of the base portions 14. Moreover, the chamfer has a radius of curvature r, which is 0.5 mm or less and is preferably 0.3 mm. Of course, although the chamfer is provided according to this embodiment, it is completely possible to eliminate the chamfer but make a direct linear connection.

In addition, it is described in this embodiment that the V-shaped slot is formed on one single side of the base portions 14, but it may be formed on both of a top side and a bottom side of the base portions 14.

According to this embodiment, when taking off the clamps from the clamp set to install them in the seat, they can be removed by an operator with one hand by simply breaking the fragile portions, thereby making it possible to improve the operating efficiency as well as shorten the operating time. Furthermore, since conventional devices such as clamp feeding devices are not required, the cost can be reduced. In addition, since the fragile portion is a structure that can be simply broken and thus no extra members are generated, the molding materials can be saved, and the removed clamps can also be mounted in the seat without any further handling after the removal.

Second Embodiment

Figure 9:
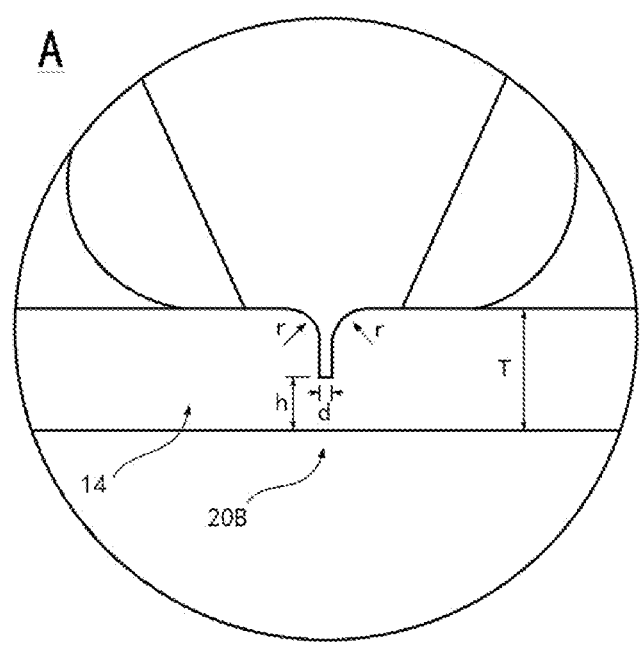
FIG. 9 is an enlarged view of the part A of FIG. 7B, and is a cross-sectional view showing a fragile portion according to a second embodiment of the present disclosure.

A fragile portion 20B according to a second embodiment is described with reference to FIG. 9. As shown in FIG. 9, the fragile portion 20B is formed between the base portions 14 of two adjacent clamps 10 with a thickness smaller than that of the base portions 14. The fragile portion 20B is formed by a rectangular slot recessed in the base portions 14.

Here, as discussed above, the thickness T of the base portions 14 is about 1 mm. In contrast, the fragile portion 20B has a thickness h that is substantially no more than half of that of the base portions 14. That is, the thickness h of the fragile portion 20B is 0.5 mm or less. Preferably, the thickness h of the fragile portion 20B is about 0.4 mm.

In addition, with respect to the rectangular slot forming the fragile portion 20B, a bottom width d thereof is 0.1 mm or less, and is preferably about 0.06 mm.

According to this embodiment, a chamfer is formed between the rectangular slot forming the fragile portion 20B and each of the base portions 14. Moreover, the chamfer has a radius of curvature r, which is 0.5 mm or less, and is preferably 0.3 mm. Of course, although the chamfer is provided according to this embodiment, it is completely possible to eliminate the chamfer but make a direct linear connection.

In addition, it is described in this embodiment that the rectangular slot is formed on one single side of the base portions 14, but it may be formed on both of a top side and a bottom side of the base portions 14.

According to this embodiment, the same technical effect as that of the first embodiment can be achieved as well.

Third Embodiment

Figure 10:
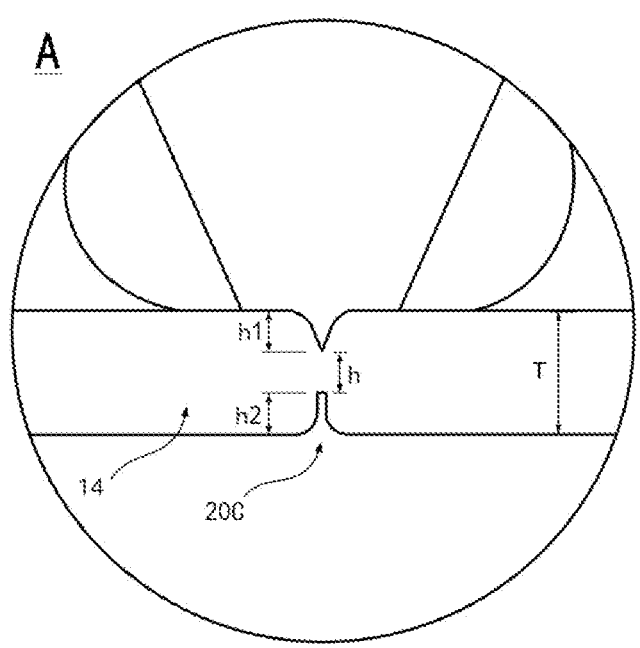
FIG. 10 is an enlarged view of the part A of FIG. 7B, and is a cross-sectional view showing a fragile portion according to a third embodiment of the present disclosure.

A fragile portion 20C according to a third embodiment is described with reference to FIG. 10. As shown in FIG. 10, the fragile portion 20C is formed between the base portions 14 of two adjacent clamps 10 with a thickness smaller than that of the base portions 14. The fragile portion 20C is formed by recessed in the base portions 14. Specifically, it is recessed in the base portions 14 at a top side (the side of the clamping portion) in the form of a V-shaped slot and at a bottom side in a form of rectangular slot, thus forming the fragile portion 20C having the thickness h smaller than that of the base portions 14 between the V-shaped slot and the rectangular slot.

Here, reference may be made to the fragile portion 20A according to the first embodiment for the V-shaped slot, and to the fragile portion 20B according to the second embodiment for the rectangular slot.

For the fragile portion 20C, for example, when the thickness thereof is preferably about 0.4 mm, it is preferable that a height h1 of the V-shaped slot and a height h2 of the rectangular slot are each about 0.3 mm. Of course, the height h1 of the V-shaped slot and the height h2 of the rectangular slot may be the same, or may be different.

According to this embodiment, the same technical effect as that of the first embodiment can be achieved as well.

Fourth Embodiment

Figure 11:
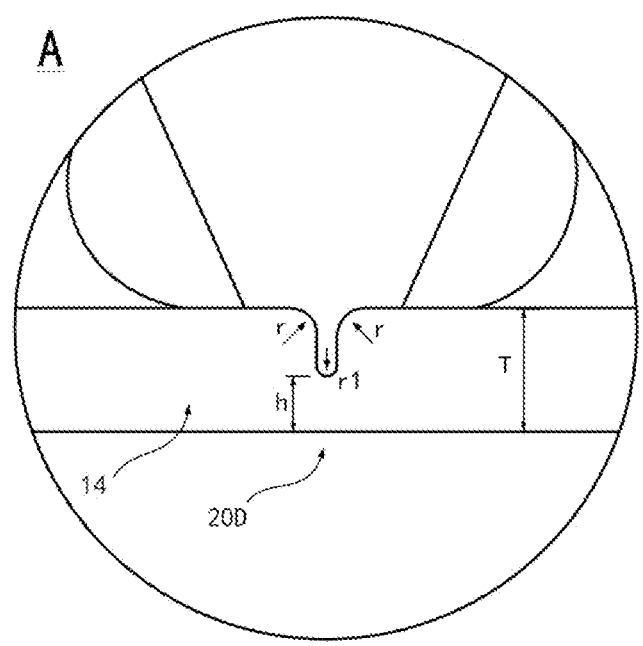
FIG. 11 is an enlarged view of the part A of FIG. 7B, and is a cross-sectional view showing a fragile portion according to a fourth embodiment of the present disclosure.

A fragile portion 20D according to a fourth embodiment is described with reference to FIG. 11. As shown in FIG. 11, the fragile portion 20D is formed between the base portions 14 of two adjacent clamps 10 with a thickness smaller than that of the base portions 14. The fragile portion 20D is formed by a runway-shaped slot recessed in the base portions 14.

Here, as discussed above, the thickness T of the base portions 14 is about 1 mm. In contrast, the fragile portion 20D has a thickness h that is substantially no more than half of that of the base portions 14. That is, the thickness h of the fragile portion 20D is 0.5 mm or less. Preferably, the thickness h of the fragile portion 20D is about 0.4 mm.

In addition, for the runway-shaped slot forming the fragile portion 20D, its bottom has a radius of curvature r1, which 0.05 mm or less and is preferably about 0.03 mm.

Further, it is described in this embodiment that the runway-shaped slot is formed on one single side of the base portions 14, but it may be formed on both of a top side and a bottom side of the base portions 14.

According to this embodiment, the same technical effect as that of the first embodiment can be achieved as well.

Here, it has been described the case where the thickness of the fragile portion is smaller than that of the base portions based on the first to fourth embodiments, but the present invention is not limited thereto. It is also possible to make the coupling portion between the adjoined base portions lower in rigidity than the base portions, so that the operator can take the clamps off the clamp set by simply breaking the fragile portion with one hand when needed to mount them in the seat. According to this difference in rigidity, the same technical effect as that of the first embodiment can be achieved as well.

Of course, the form of the fragile portion is not limited to those as described above, and it can also be achieved by changing the material of the fragile portion, or by changing the density of the fragile portion, or even by openings in the fragile portion, that is, as long as the clamps can be removed by simply breaking the fragile portion with one hand.

<First Variant>

Figure 12:
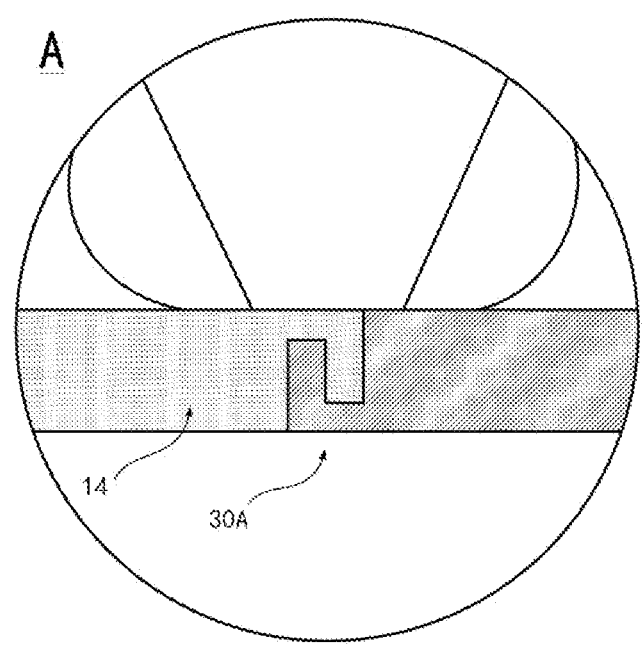
FIG. 12 is an enlarged view of the part A of FIG. 7B, and is a cross-sectional view showing a fragile portion according to a first variant of the present disclosure.

A coupling portion 30A according to a first variant is described with reference to FIG. 12. As shown in FIG. 12, the coupling portion 30A is formed between base portions 14 of two adjacent clamps 10 for coupling them together. The coupling portion 30A is formed by forming concave/convex engaging portions on both long edges of each of the base portions 14.

Specifically, the base portion 14 is formed with an inverted U-shaped engaging portion on one of its long edges, and with a U-shaped engaging portion on the other long edge, and two base portions 14 are coupled by engaging two adjacent engaging portions and thus couple two clamps 10 together.

According to this embodiment, it is provided an additional step of engaging the clamps 10 to each other as compared with the first to fourth embodiments, but the clamps 10 can also be simply removed with one hand when used. Therefore, the same technical effect as that of the first embodiment can be achieved as well.

<Second Variant>

Figure 13:
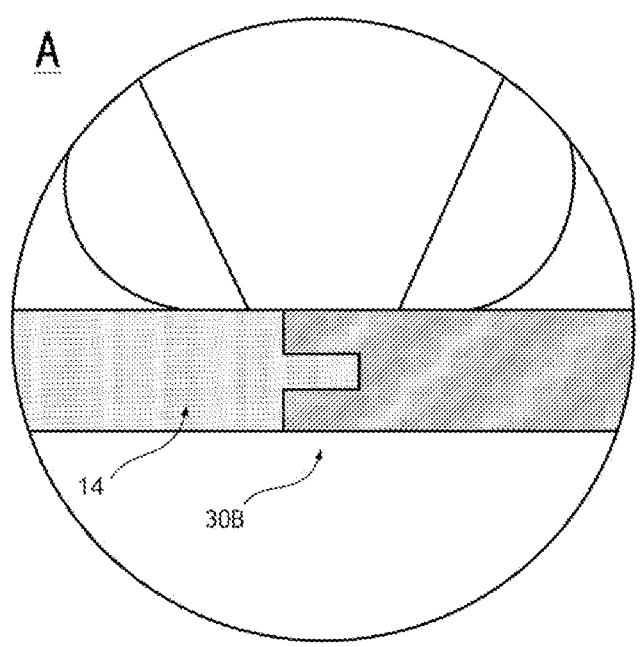
FIG. 13 is an enlarged view of the part A of FIG. 7B, and is a cross-sectional view showing a fragile portion according to a second variant of the present disclosure.

A coupling portion 30B according to a second variant is described with reference to FIG. 13. As shown in FIG. 13, the coupling portion 30B is formed between base portions 14 of two adjacent clamps 10 for coupling them together. The coupling portion 30B is formed by forming concave/convex engaging portions on both long edges of each of the base portions 14.

The second variant differs from the first variant in that the concave/convex shape according to the second variant is formed along an extending direction of the base portion 14. That is, the base portion 14 is formed with a convex portion that protrudes along its extending direction on one of its long edges, and with a concave portion that is recessed therein along its extending direction on the other long edge, and two base portions 14 are coupled by concave-convex engagement of two adjacent concave and convex portions and thus couple two clamps 10 together.

According to this embodiment, the same technical effect as that of the first variant can also be achieved.

Herein, the various embodiments and variants described in the present disclosure are examples for explaining the claims, and they can be used in combination as desired.

LIST OF REFERENCE NUMERALS

10—clamp
14—base portion
20, 20A, 20B, 20C, 20D—fragile portion
30A, 30B—coupling portion
100—clamp set
h—thickness of fragile portion
T—thickness of base portion
θ—angle of V-shaped slot
d—width of bottom of rectangular slot

What is claimed is:

1. A covering clamping clamp set formed by coupling a plurality of clamps together, wherein each of the clamps comprises:
    a planar base portion formed as a planar plate shape and retaining a foam body;
    the planar plate shape having a long dimension having long edges and a short dimension having short edges, and including a notch formed into each long edge; and
    a clamping portion protruding from the planar base portion and configured to clamp a member which is mounted on a covering that covers the foam body;
    wherein a fragile portion is formed on each long edge outside of the notch; and
    wherein the plurality of clamps are coupled to one another by the fragile portions, which have a thickness smaller than that of the planar base portion.

2. The covering clamping clamp set according to claim 1, characterized in that the fragile portion is formed by a slot having a V-shaped cross section.

3. The covering clamping clamp set according to claim 1, characterized in that the fragile portion is formed by a slot having a rectangular cross section.

4. The covering clamping clamp set according to claim 1, characterized in that in a thickness direction of the base portion, one side of the fragile portion is formed by a slot having a V-shaped cross section, and the other side of the fragile portion is formed by a slot having a rectangular cross section.

5. The covering clamping clamp set according to claim 2, characterized in that an angle of the V-shaped slot is between 30 and 90 degrees.

6. The covering clamping clamp set according to claim 4, characterized in that an angle of the V-shaped slot is 60 degrees.

7. The covering clamping clamp set according to claim 3, characterized in that a bottom of the rectangular slot has a width of 0.1 mm or less.

8. The covering clamping clamp set according to claim 7, characterized in that the width of the bottom of the rectangular slot is 0.06 mm.

9. The covering clamping clamp set according to claim 1, characterized in that the fragile portion has a thickness no more than half of that of the base portion.

10. The covering clamping clamp set according to claim 9, characterized in that the thickness of the fragile portion is 0.5 mm or less.

11. The covering clamping clamp set according to claim 10, characterized in that the thickness of the fragile portion is 0.4 mm.

12. A covering clamping clamp set formed by coupling a plurality of clamps together, wherein each of the clamps comprises:
- a base portion formed as a plate shape and retaining a foam body;
- the plate shape having a long dimension having long edges and a short dimension having short edges, and including a notch formed into each long edge;
- two clamping portions protruding from the base portion and each configured to clamp a member which is mounted on a covering that covers the foam body;
- wherein a coupling portion is formed on each long edge outside of the notch; and
- wherein the plurality of clamps are coupled to one another by the coupling portions.

13. The covering clamping clamp set according to claim 4, characterized in that an angle of the V-shaped slot is between 30 and 90 degrees.

14. The covering clamping clamp set according to claim 4, characterized in that a bottom of the rectangular slot has a width of 0.1 mm or less.

15. The covering clamping clamp set according to claim 2, characterized in that the fragile portion has a thickness no more than half of that of the base portion.

16. The covering clamping clamp set according to claim 3, characterized in that the fragile portion has a thickness no more than half of that of the base portion.

* * * * *